US007170509B2

(12) United States Patent
Tanaka et al.

(10) Patent No.: US 7,170,509 B2
(45) Date of Patent: Jan. 30, 2007

(54) INFORMATION PROCESSING APPARATUS, PROGRAM FOR PRODUCT ASSEMBLY PROCESS DISPLAY, AND METHOD FOR PRODUCT ASSEMBLY PROCESS DISPLAY

(75) Inventors: Yutaka Tanaka, Nagano (JP); Kazunori Toshima, Kanagawa (JP); Minoru Murano, Kanagawa (JP); Hisatomo Ogawa, Tokyo (JP); Takeshi Nagamatsu, Saitama (JP); Tomomi Fujimoto, Tokyo (JP)

(73) Assignees: Panasonic Communications Co., Ltd., Tokyo (JP); Nippon Systemware Co., Ltd., Tokyo (JP)

( * ) Notice: Subject to any disclaimer, the term of this patent is extended or adjusted under 35 U.S.C. 154(b) by 317 days.

(21) Appl. No.: 10/327,876

(22) Filed: Dec. 26, 2002

(65) Prior Publication Data

US 2003/0197700 A1   Oct. 23, 2003

(30) Foreign Application Priority Data

Apr. 17, 2002   (JP) .............................. 2002-115097

(51) Int. Cl.
G06T 15/00 (2006.01)
G06T 15/10 (2006.01)
G06T 15/20 (2006.01)
G06T 15/70 (2006.01)
G06T 13/00 (2006.01)

(52) U.S. Cl. ...................... 345/419; 345/427; 345/473; 345/474; 345/475

(58) Field of Classification Search ................ 345/419, 345/420, 473–475, 629, 634, 423, 426, 427

See application file for complete search history.

(56) References Cited

U.S. PATENT DOCUMENTS

| 4,757,461 | A | * | 7/1988 | Stohr et al. ................. 345/419 |
| 4,841,291 | A | * | 6/1989 | Swix et al. ................. 345/473 |
| 4,985,855 | A | * | 1/1991 | Aldrich et al. ............. 345/419 |
| 5,010,502 | A | * | 4/1991 | Diebel et al. ............... 345/419 |
| 5,303,337 | A | * | 4/1994 | Ishida ........................ 345/419 |
| 5,430,837 | A | * | 7/1995 | Matsuo ...................... 715/502 |
| 5,459,830 | A | * | 10/1995 | Ohba et al. ................. 345/473 |
| 5,502,807 | A | * | 3/1996 | Beachy ....................... 345/473 |
| 5,619,630 | A | * | 4/1997 | Minami et al. ............. 345/619 |
| 5,696,892 | A | * | 12/1997 | Redmann et al. .......... 345/582 |
| 5,767,855 | A | * | 6/1998 | Bardon et al. ............. 715/848 |
| 5,771,043 | A | * | 6/1998 | Nigawara et al. .......... 345/419 |
| 5,862,229 | A | * | 1/1999 | Shimizu ....................... 381/17 |
| 5,905,501 | A | * | 5/1999 | Kato ........................... 345/420 |
| 5,999,173 | A | * | 12/1999 | Ubillos ....................... 715/724 |

(Continued)

Primary Examiner—Ulka Chauhan
Assistant Examiner—Roberta Prendergast
(74) Attorney, Agent, or Firm—Greenblum & Bernstein P.L.C.

(57) ABSTRACT

A hard disk stores a CAD file having 3-D data that relates to an assembly product comprised of a plurality of parts. Based on this 3-D data of an assembly product, a parts data retriever retrieves 3-D data for each part. According to this 3-D data for each part, a bitmap output unit generates 2-D bitmap image data illustrating the part image, which is viewed from a predetermined direction. Moreover, using the 2-D data of the part, a management data generator generates a management table describing steps to output an assembly scene on a screen. A file having this management table and a file having 2-D data are then delivered to a PC for assembly scene output, in order to output the assembly scene.

12 Claims, 16 Drawing Sheets

U.S. PATENT DOCUMENTS

| | | | |
|---|---|---|---|
| 6,295,063 B1 * | 9/2001 | Minami et al. | 345/419 |
| 6,388,667 B1 * | 5/2002 | Sato et al. | 345/473 |
| 6,434,441 B1 * | 8/2002 | Beauchamp et al. | 700/98 |
| 6,476,815 B1 * | 11/2002 | Ando | 345/473 |
| 6,636,249 B1 * | 10/2003 | Rekimoto | 715/849 |
| 6,636,774 B1 * | 10/2003 | Tenma et al. | 700/96 |

* cited by examiner

Fig.3
line # 1 for 1st scene
(entire line # 1)
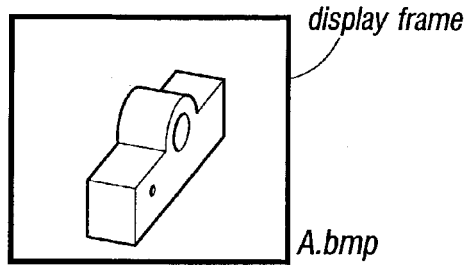
line # 2 for 1st scene
(entire line # 2)
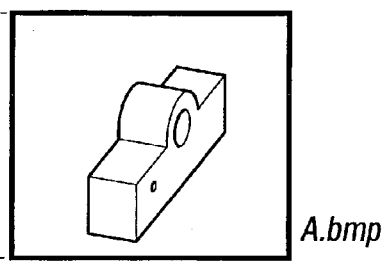
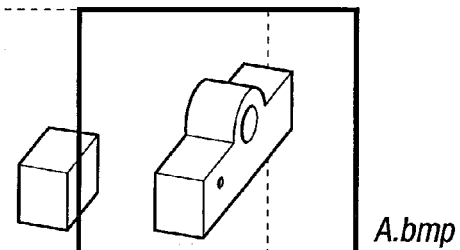
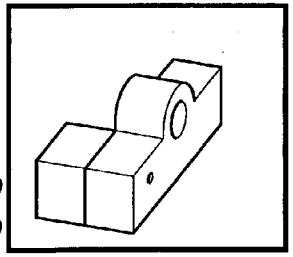
line # 3 for 1st scene
(entire line # 3)
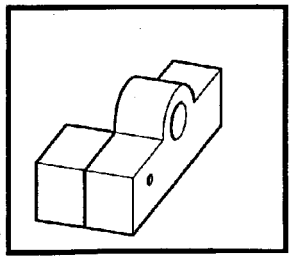

Fig.5
continuation of
line # 2 and 3 for
2nd scene
(entire line # 5 and 6)
WK1-1.bmp
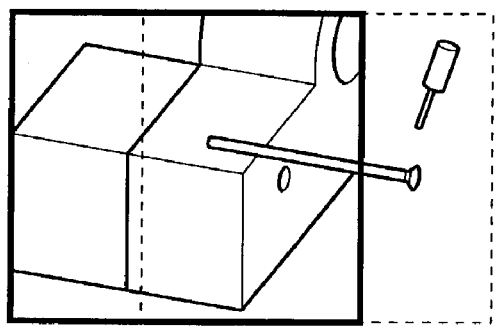
Driver.bmp
C.bmp
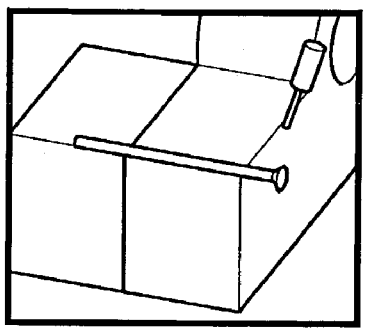
WK1-1.bmp
Driver.bmp
C.bmp
line # 4 for 2nd scene
(entire line # 7)
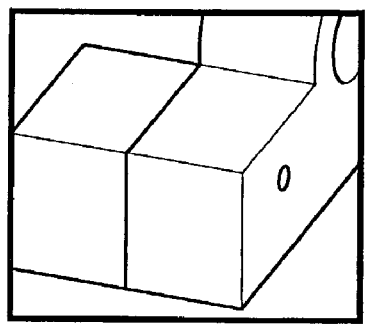
WK2-1.bmp

Fig.6 line # 1 for scene3
(entire line # 8)

WK2.bmp line # 2 for scene3
(entire line # 9)

WK2.bmp                                        D.bmp

WK2.bmp                                        D.bmp

WK2.bmp
D.bmp line # 1 for scene4
(entire line # 10)

TOP.bmp line # preliminary management table

| No | Part | Time | move | view change | UID | Comp flg | dept | kind | Non rev |
|----|------|------|------|-------------|-----|----------|------|------|---------|
| 1  | A    | 3    | 2    |             | 1   | 1        | 0    | 0    |         |
| 1  | B    | 3    | 2    |             | 2   | 1        | 0    | 0    |         |
| 1  | C    | 3    | 2    |             | 3   | 1        | 0    | 0    |         |
| 1  | D    | 3    | 2    |             | 4   | 1        | 0    | 0    |         |
| 1  | TOP  | 0    | 0    |             | 5   | 2        | 0    | 0    |         |

Fig.14 management table

| line # | No | Part | Time | move | view change | UID | Comp flg | dept | kind | Non rev |
|---|---|---|---|---|---|---|---|---|---|---|
| 1 | 1 | A | 0 | 0 | | 1 | 1 | 1 | 0 | |
| 2 | 1 | B | 3 | 2 | | 2 | 1 | 0 | 0 | |
| 3 | 1 | WK1 | 0 | 0 | | | 2 | 2 | 0 | |
| 4 | 2 | WK1 | 0 | 0 | 1 | | 2 | 0 | 0 | |
| 5 | 2 | Driver | 0 | 1 | | | | 0 | 1 | |
| 6 | 2 | C | 3 | 1 | | 3 | 1 | 0 | 0 | |
| 7 | 2 | WK2 | 0 | 0 | | | 2 | 0 | 0 | |
| 8 | 3 | WK2 | 0 | 0 | | | 2 | 0 | 0 | |
| 9 | 3 | D | 3 | 1 | | 4 | 1 | 0 | 0 | |
| 10 | 4 | TOP | 0 | 0 | | 5 | 2 | 0 | 0 | |
| 11 | R | | | | | | | | | |

Fig.15 management table for output

| line # | No | filename | Time | move | dept | through_color | non_rev |
|---|---|---|---|---|---|---|---|
| 1 | 1 | A.bmp | 0 | 0 | 1 | 000000 | |
| 2 | 1 | B.bmp | 3 | 2 | 0 | 000000 | |
| 3 | 1 | WK1.bmp | 0 | 0 | 2 | 000000 | |
| 4 | 2 | WK1-1.bmp | 0 | 0 | 0 | 000000 | |
| 5 | 2 | Driver.bmp | 0 | 1 | 0 | 000000 | |
| 6 | 2 | C.bmp | 3 | 1 | 0 | 000000 | |
| 7 | 2 | WK2-1.bmp | 0 | 0 | 0 | 000000 | |
| 8 | 3 | WK2.bmp | 0 | 0 | 0 | 000000 | |
| 9 | 3 | D.bmp | 3 | 1 | 0 | 000000 | |
| 10 | 4 | TOP.bmp | 0 | 0 | 0 | 000000 | |
| 11 | R | | | | | | |

Fig.16 scenario table scene1

| filename | display time | stopping time | move | dept | displaying coordinates | moving coordinates | ... |
|---|---|---|---|---|---|---|---|
| A.bmp | 3 | 0 | 0 | 1 | none | none | ... |
| B.bmp | 3 | 0 | 2 | 0 | X2,Y2 | X1,Y1 | ... |
| WK1.bmp | 0 | 3 | 0 | 2 | none | none | ... | scene2

| filename | display time | stopping time | move | dept | displaying coordinates | moving coordinates | ... |
|---|---|---|---|---|---|---|---|
| ⋮ | ⋮ | ⋮ | ⋮ | ⋮ | ⋮ | ⋮ | ... | scene3

| filename | display time | stopping time | move | dept | displaying coordinates | moving coordinates | ... |
|---|---|---|---|---|---|---|---|
| ⋮ | ⋮ | ⋮ | ⋮ | ⋮ | ⋮ | ⋮ | ... | scene4

| filename | display time | stopping time | move | dept | displaying coordinates | moving coordinates | ... |
|---|---|---|---|---|---|---|---|
| TOP.bmp | 0 | 0 | 0 | 0 | none | none | ... |

INFORMATION PROCESSING APPARATUS, PROGRAM FOR PRODUCT ASSEMBLY PROCESS DISPLAY, AND METHOD FOR PRODUCT ASSEMBLY PROCESS DISPLAY

BACKGROUND OF THE INVENTION

1. Field of the Invention

This invention relates to an information processing apparatus, a program for product assembly process display, and a method for product assembly process display, that output scenes on a screen, for assembling a product made from a plurality of parts.

2. Description of Related Art

In order to effectively explain steps of a product assembly made from a plurality of parts, to a worker at the assembly line, video images of assembly work using real parts have been used. However, creation of such a learning video requires an immense effort. When an information processing apparatus is used to display virtual parts illustrating an assembly scene on a display, a cost cutting effect can be expected by omitting the video capturing time. However, this process is also burdensome, since image data for each part needs to be newly prepared. In contrast, when computer assisted design (CAD) data generated during a designing step is applied to image data of parts, it is possible to omit the process of generating the image data, thereby lowering the cost of generating data for assembly scene output.

However, image used in a 2-D (two-dimensional) CAD is an illustrated view from one direction, therefore it is not necessarily the suitable image for the assembly scene. Also, 2-D image may be difficult to easily illustrate the assembly scene. Although it is possible to select an arbitrarily angle when a 3-D (three-dimensional) CAD image is applied, in order to easily illustrate the assembly scene, an enormous amount of data needs to be processed for outputting the assembly scene, thereby making it difficult for a PC for a regular office use to output the data, and eventually increasing the cost.

SUMMARY OF THE INVENTION

The present invention addresses the above-described problems of the conventional technologies. The main purpose of the invention is to provide an information processing apparatus, a program for product assembly process display, and a method for product assembly process display, that use only a small amount of data handling the output of assembly scenes, output assembly scene with a low processing capability, apply data generated from a designing process, and simply illustrate the assembly scene using image of a part from an angle suitable for the assembly scene display.

In order to serve the above-described purpose, the image processing apparatus is provided with a 3-D data memory that stores 3-D data related to a product assembled by a plurality of parts, a data retriever that retrieves 3-D data for each part from the 3-D data related to the product, a 2-D data generator that generates 2-D data illustrating an image of each part viewed from a predetermined direction based on the 3-D data of each part, a 2-D data memory that stores 2-D data for each part, and a management data generator that generates management data describing steps to allow another information processing apparatus to output an assembly scene on a display, by using the 2-D data of each part. Accordingly, it is possible to lighten the load of assembly scene output, as well as reducing the cost by using a general PC as the information processing apparatus to output the assembly scene.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 is a schematic diagram illustrating a display output at the PC for outputting the assembly scene of FIG. 2;

FIG. 5 is another schematic diagram illustrating a display output at the PC for outputting the assembly scene of FIG. 2;

FIG. 6 is another schematic diagram illustrating a display output at the PC for outputting the assembly scene of FIG. 2;

FIG. 14 illustrates a management table stored in a management data file of FIG. 1;

FIG. 15 illustrates a management table for output, stored by a management data file for output of FIG. 1;

FIG. 16 illustrates a scenario table generated on a RAM of FIG. 2;

DETAILED DESCRIPTION OF PREFERRED EMBODIMENTS

The embodiment of the present invention is explained in the following, in reference to the above-described drawings.

Figure 1:
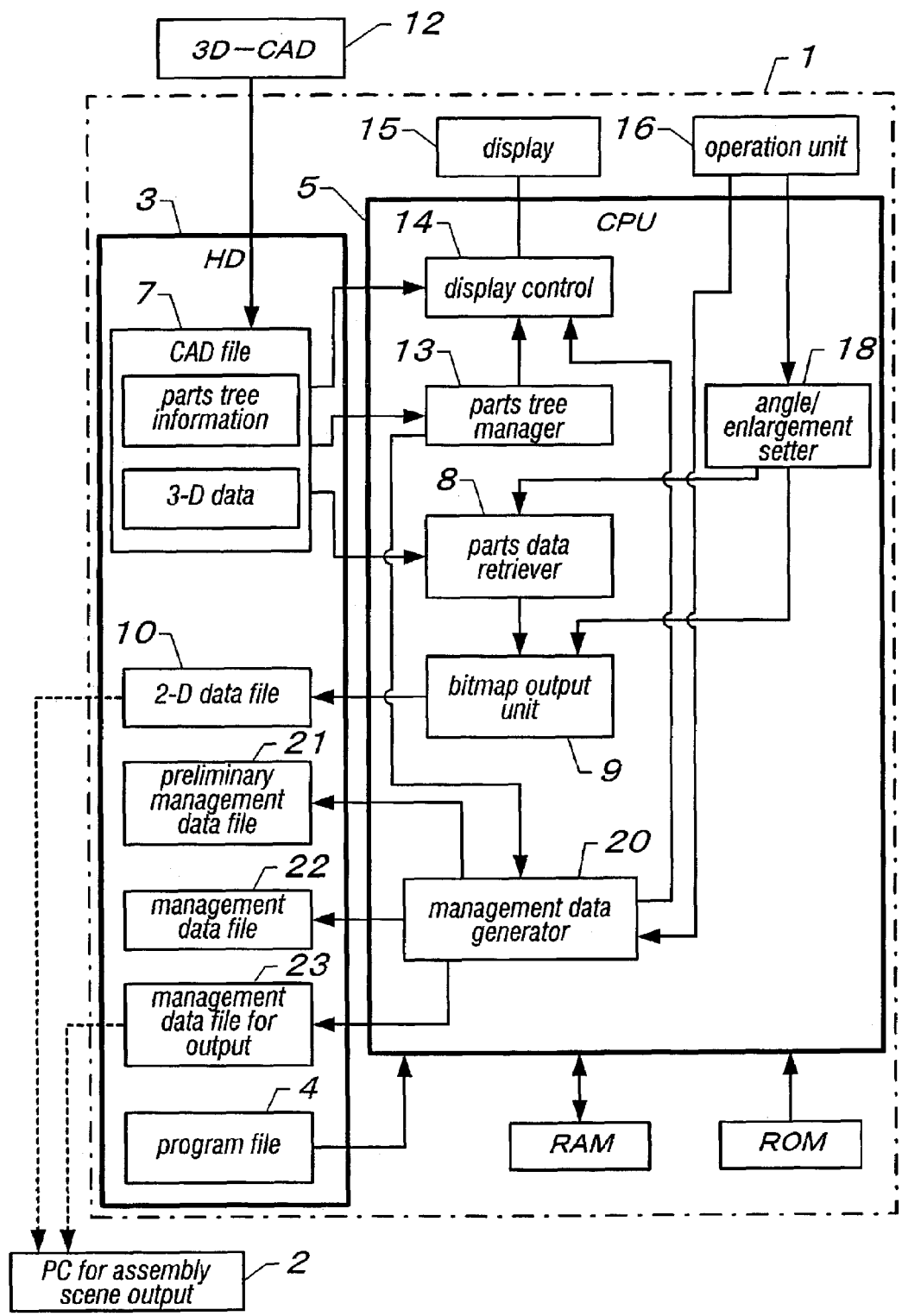
FIG. 1 is a schematic block diagram illustrating an information processing apparatus according to the present invention.

FIG. 1 is a schematic block diagram illustrating an information processing apparatus according to the present invention. Information processing apparatus 1 generates data to enable PC 2 for assembly scene output (another information processing apparatus) 2 to output on a screen. Information processing apparatus 1 also reads out program file 4 stored in hard disk 3. CPU 5 executes execute a predetermined process in accordance with program file 4.

In information processing apparatus 1, CAD file 7, storing 3-D data related to an assembled product made of plurality of parts, is stored in hard disk 3 (3-D data memory). This 3-D data for each part is retrieved by parts data retriever (data retriever) 8, from the 3-D data related to the assembled products. Based on the retrieved 3-D data for each part, 2-D bitmap image data illustrating a part image from a predetermined direction is generated by bitmap output unit (2-D data generator) 9, and 2-D data file 10 storing the image data for each part is stored in hard disk (2-D data memory) 3.

CAD file 7 is an output from 3-D CAD apparatus 12 in a data format of XVL (eXtensible Virtual world description Language). CAD file 7 stores 3-D data as well as parts tree information illustrating a tree-shaped assembly process from a plurality of parts to a final assembled product.

Parts data retriever 8 retrieves 3-D data from the CAD file, the data corresponding to parts and an "ASSEMBLY" (preliminarily assembled product) that is constructed during an assembly procedure from individual parts to the final assembled product. Based on the obtained 3-D data of the ASSEMBLY, bitmap output unit 9 generates 2-D image data.

Based on the parts tree information of CAD file 7, parts data retriever 8 specifies parts and ASSEMBLY in order to retrieve data. Parts tree manager 13 analyzes the retrieved parts tree information, while display controller 14 displays the parts tree structure diagram on display 15. Then, an operator uses operation unit 16, including a keyboard and pointing device, on the parts tree structure diagram, in order to specify the retrieving parts and ASSEMBLY. Detail illustrations of the above are later provided using FIGS. 8–12.

Upon generating 2-D data, specifying a conversion condition such as a view point location and projection angle for the 2-D imaging, is performed as follows. First, display 15 displays the parts and ASSEMBLY images visualized from 3-D data, so that the operator views the display and inputs an appropriate conversion condition using operation unit 16. This input information is then transmitted from angle/enlargement setter 18 to parts data retriever 8 and bitmap output unit 9 to generate 2-D image data based on the specified conversion condition. Similarly, to specify display sizes of parts and ASSEMBLY, the operator views an image displayed on display 15 and inputs an appropriate display size using operation unit 16. This input information is then transmitted from angle/enlargement setter 18 to bitmap output unit 9 to generate 2-D image data based on the specified display size.

In addition, in information processing apparatus 1, management data generator 20 generates a management table (management data) describing steps to output the assembly procedure on a screen, by using 2-D data for each part and ASSEMBLY. Management data generator 20 first generates a preliminary management table based on parts tree information of CAD file 7, which is stored in hard disk 3, as preliminary management data file 21. This preliminary management table is also displayed on display 15 by display controller 14 so that the operator can alter the contents using operation unit 16. This input information at operation unit 16 is transmitted to management data generator 20, and modified management table is stored in hard disk 3 as management data file 22. Further, management data generator 20 generates an output management table based on the modified management table, which is stored in hard disk 3 as output management data file 23. Detail illustrations of the above are later provided using FIGS. 13–15.

Figure 2:
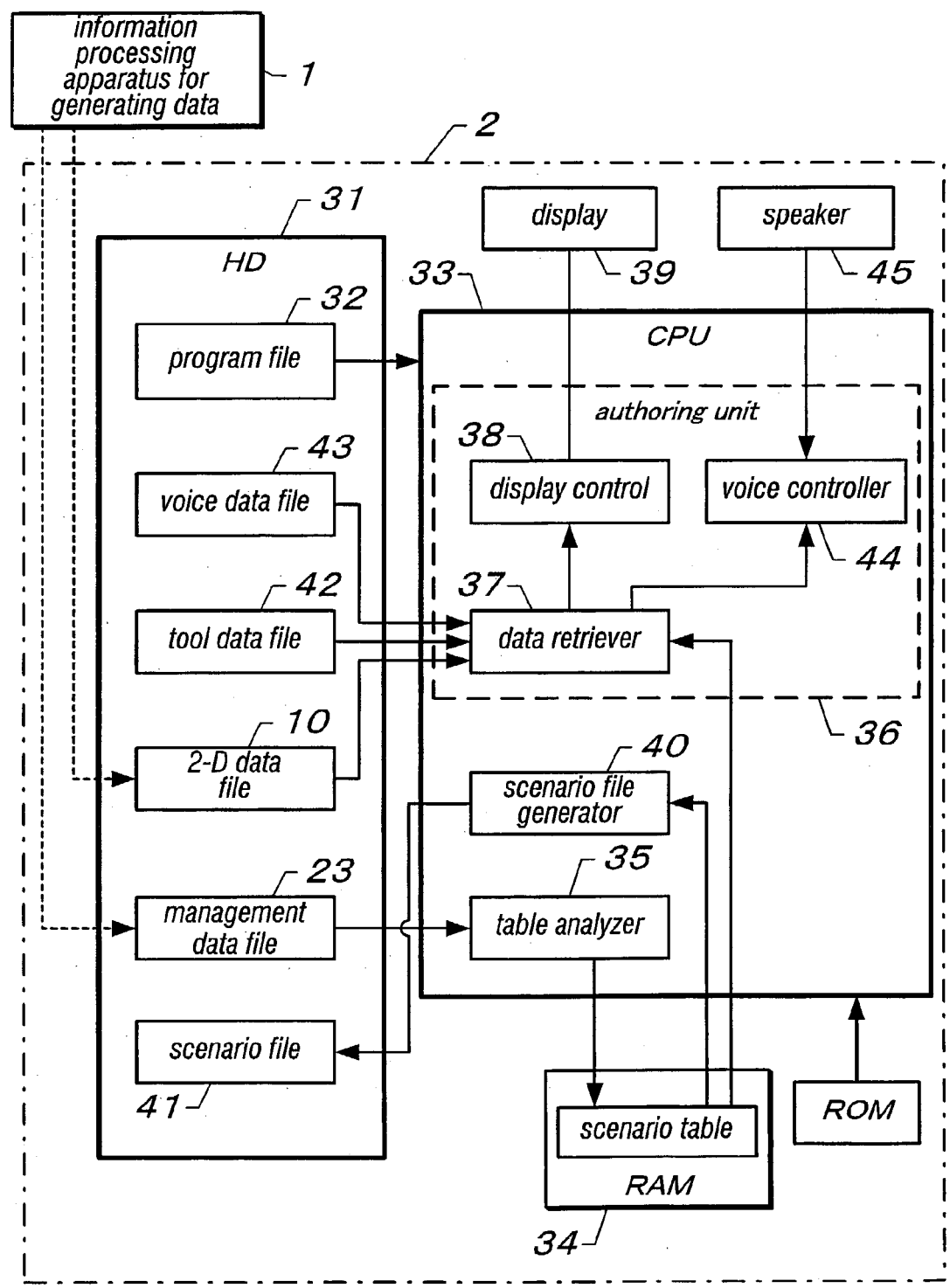
FIG. 2 is a schematic block diagram illustrating a PC for assembly scene output of FIG. 1.

FIG. 2 is a schematic block diagram illustrating a configuration of PC for assembly scene output of FIG. 1. 2-D data file 10 and output management data file 23 that are generated by information processing apparatus 1 of FIG. 1, are stored in hard disk (2-D data memory, management data memory) 31. This PC 2 for assembly scene output outputs an assembly procedure on a screen, using the data file, i.e., Program file 23 stored in hard disk 31 is read out to execute a predetermined process at CPU 33.

In this PC for assembly scene output 2, management data file 23 stored in hard disk 31 is retrieved, so that the management table within the file is stored in RAM 34 as a scenario table. The table is then analyzed by table analyzer 35, and the information actually needed for the assembly scene output is setup in the scenario table. Based on this scenario table, authoring unit 36 controls the assembly scene output. In authoring unit 36, data retriever 37 retrieves image data of necessary parts, ASSEMBLY, and a completed product from 2-D data file 10, according to the scenario table. By processing the image data according to the steps described in the scenario table, it is possible for display controller 38 to display the assembly scene on display 39. The scenario table, with the necessary setup information processed by table analyzer 35, is added to scenario file 41 by scenario file generator 40, and stored in hard disk 31. Therefore, when the assembly scene is re-output, this scenario file 41 is read out from hard disk 31, and the scenario table is generated in RAM 34. The detail of the scenario table is later described using FIG. 16. In addition, the scenario file stores information for each item described in the scenario table.

Moreover, in PC for assembly scene output 2, tool data file 42 storing the image data of tools used in the assembly process is stored in hard disk (tool data memory) 31. According to the scenario table generated based on the management table in management data file 23, authoring unit 36 reads out image data of the corresponding tools, so that the tool image is output on a screen together with the images of parts and ASSEMBLY.

Further, in PC for assembly scene output 2, voice data file 43 storing voice data is stored in hard disk (voice data memory) 31. According to the scenario table, authoring unit 36 reads out corresponding voice data, and speaker (voice output unit) 45 outputs necessary voices via voice controller 44 during the screen output of parts and ASSEMBLY images.

FIGS. 3–6 are schematic illustrations of screen output by the PC for assembly scene output shown in FIG. 2. In this example, one part among a plurality of parts moves, image data according to two parts or more than two parts is overlapped each other. Then, when a plurality of data is overlapped entirely, a plurality of parts which indicate the overlapped final stage are replaced by one image of ASSEMBLY and output on the screen. Also, in a scene where a small part is introduced, the images of parts and ASSEMBLY are replaced with a partially enlarged image on the output screen. Further, the image of the corresponding part moves according to the direction of the part assembly on the output screen.

Images of parts and ASSEMBLY are displayed overlapping in the front/back direction, with a transparent background. The moving image has specified coordinates of move starting location and move ending location. At the move ending location, the parts are displayed assembled to a fixed image. Moreover, images of parts and assembly are displayed as 3-D color images with a shading method in real operation, even though they are illustrated only with lines in these figures.

FIG. 3 illustrates the first scene where ASSEMBLY WK1 is assembled from parts A and B. First, an image of part A (A.bmp) is stably displayed in a location within a display frame. Simultaneously, an image of part B (B.bmp) starts moving from a left side position outside of the display frame so that, within the display frame that is actually output on the screen, part B appears from the left edge and moves toward the right direction to be attached to a back surface of part A. This constructs ASSEMBLY WK1, thus images of parts A and B are replaced with an ASSEMBLY image (WK1.bmp).

Figure 4:
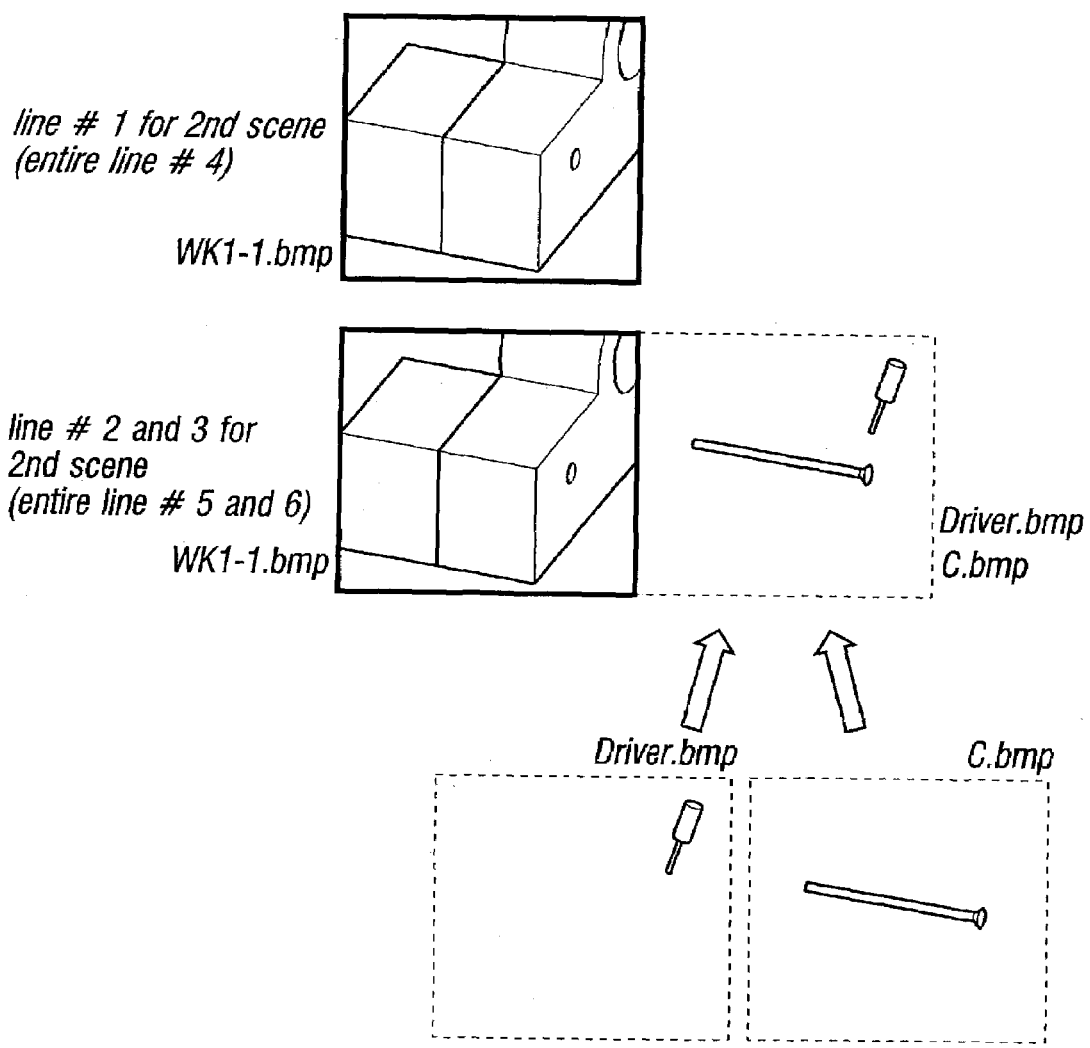
FIG. 4 is another schematic diagram illustrating a display output at the PC for outputting the assembly scene of FIG. 2.

FIGS. 4 and 5 illustrate the second scene where ASSEMBLY WK2 is constructed by attaching part C (a screw connecting parts A and B) to ASSEMBLY WK1 using a driver. First, a partially enlarged image of ASSEMBLY WK1 (WK1-1.bmp) is displayed. Simultaneously, an image of part C (C.bmp) and an image of a driver (Driver.bmp) start moving from a right side position outside of the display frame so that, within the display frame that is actually output on the screen, part C and the driver appear from the right edge and move toward the left direction to attach part C to ASSEMBLY WK1. This constructs ASSEMBLY WK2, thus images are replaced with an enlarged image of ASSEMBLY WK2 (WK2-1.bmp), having part C inserted into a hole of ASSEMBLY WK1 (in reality, parts A and B).

FIG. 6 illustrates the third scene where ASSEMBLY WK2 is completed with attaching part D. First, an image of ASSEMBLY WK2 (WK2.bmp) is displayed. Simultaneously, an image of part D (D.bmp) starts moving from a right side position outside of the display frame so that, within the display frame that is actually output on the screen, part D appears from the right edge and moves toward the left direction in order to be attached to ASSEMBLY WK2. This completes ASSEMBLY WK2, thus images are replaced with an image of completed product TOP (TOP.bmp), having part D inserted into a hole of ASSEMBLY WK2 (in reality, part A).

Figure 7:
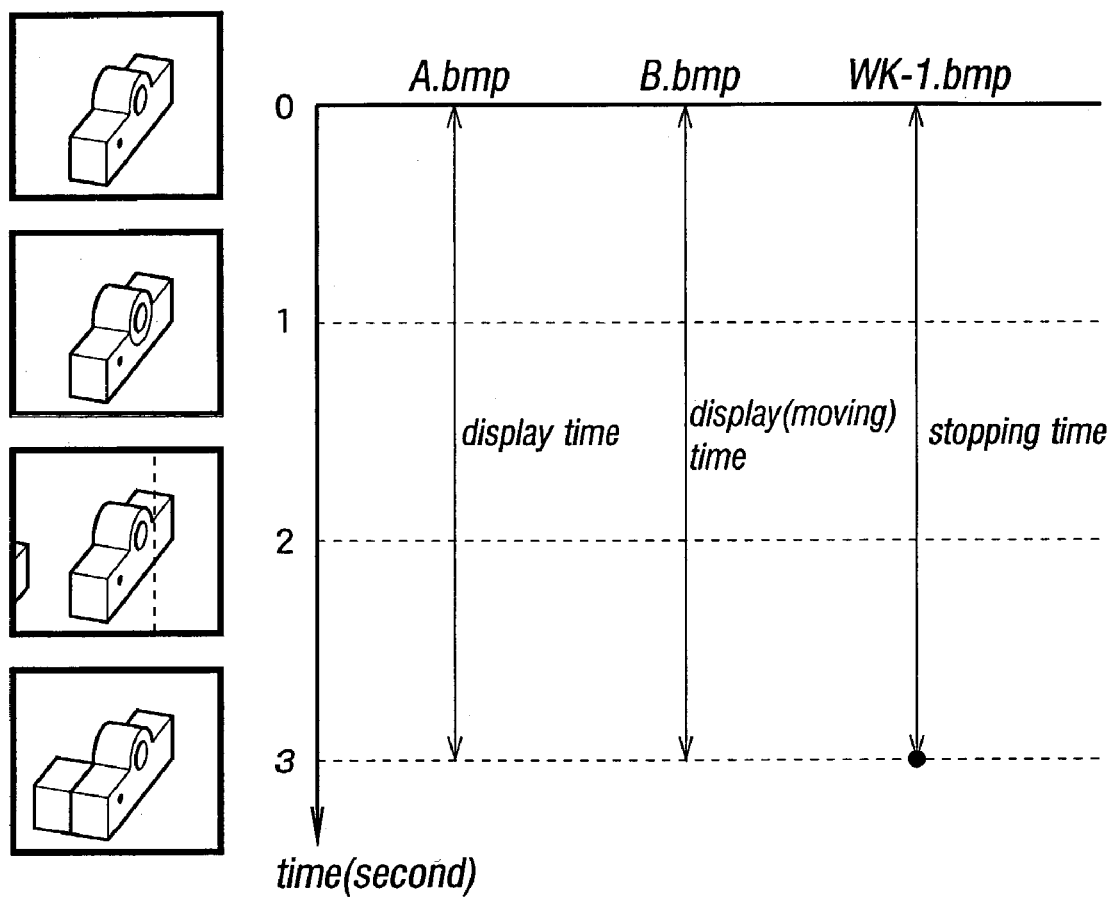
FIG. 7 illustrates a control status of the display output at the PC for outputting the assembly scene of FIG. 2.

FIG. 7 illustrates the control of screen output at the PC for assembly scene output of FIG. 2. This example uses the first scene illustrated in FIG. 3, where all images within the same scene (A.bmp, B.bmp, and WK1.bmp) start their processes simultaneously. The image of part A (A.bmp) and image of part B (B.bmp) are displayed from the beginning, and the image of part B continuously moves during the display time. The display image of the ASSEMBLY (WK1.bmp) is stopped until the display time of parts A and B ends, and is replaced with the images of parts A and B when the stopping time expires.

Figure 8:
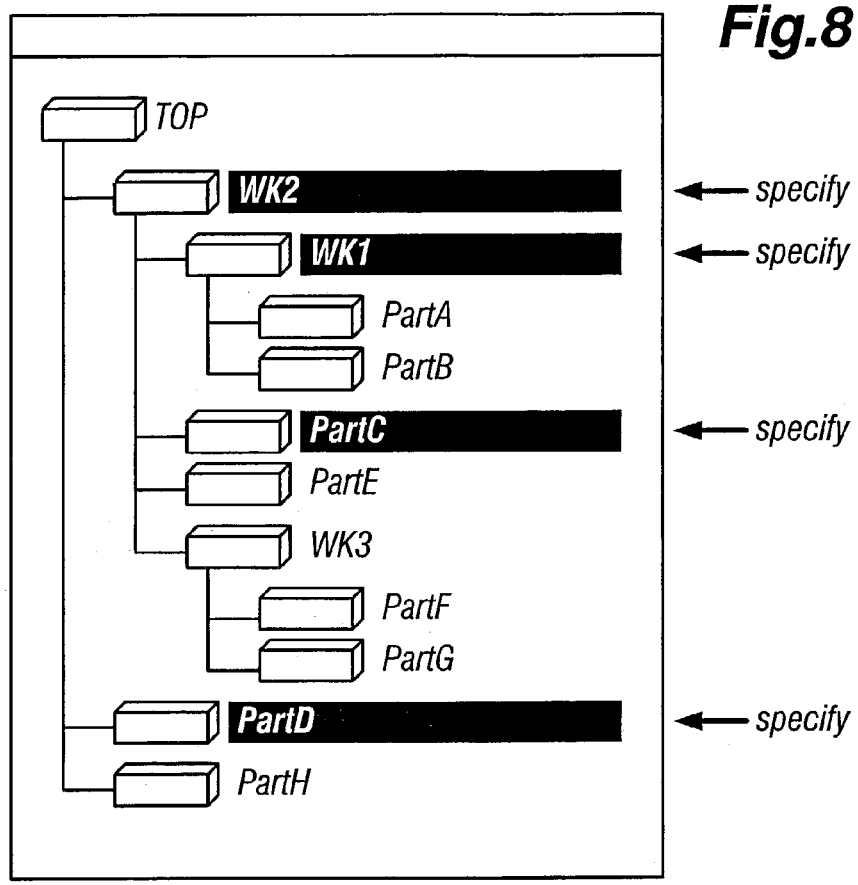
FIG. 8 illustrates a display screen of a parts tree structure diagram at the information processing apparatus for generating data of FIG. 1.

FIG. 8 illustrates a display screen of the parts tree structure diagram at the information processing apparatus for generating data shown in FIG. 1. This parts tree structure diagram illustrates a layered structure from parts via ASSEMBLIES to a completed product. Based on the parts tree information stored in the CAD file, parts and ASSEMBLIES can be selected to be the assembly scene image output. In this parts tree structure diagram, parts comprising an ASSEMBLY are displayed subordinately to the ASSEMBLY. Thus, by specifying one ASSEMBLY, individual images of parts comprising the ASSEMBLY, and the constructed image with the constructing parts are output. Since this parts tree structure diagram is generated in a structure in accordance with the assembly steps, and facilitates the visual understanding of the product configuration, it is possible to simply and accurately specify an item for output, even though the product has many parts and complicated configuration.

Figure 9:
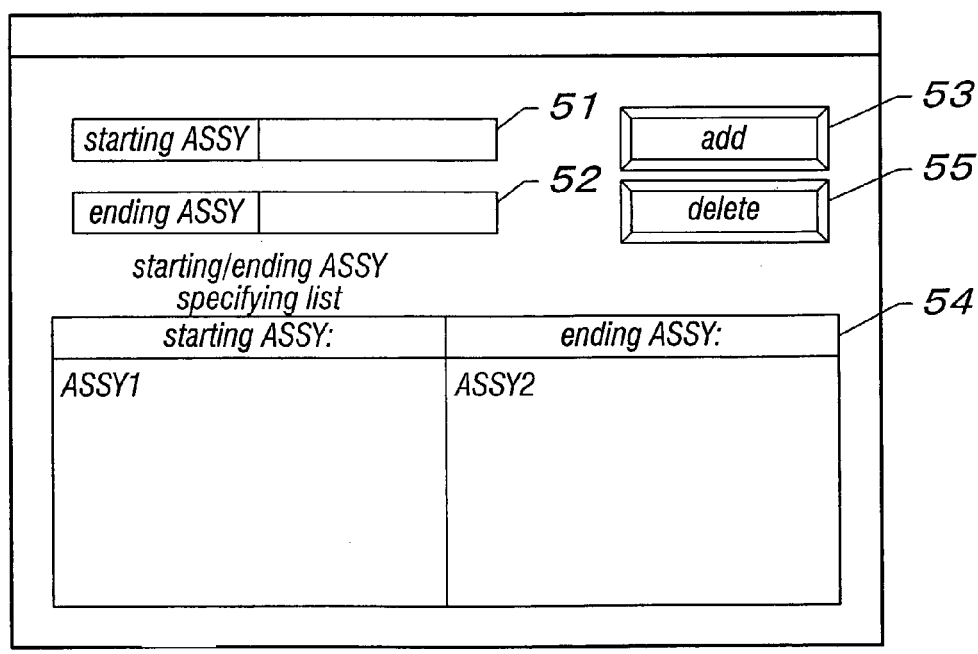
FIG. 9 illustrates a display screen of a specified range of an outputting part at the information processing apparatus for generating data of FIG. 1.

FIG. 9 illustrates a display screen of a specified range of an outputting part at the information processing apparatus for generating data of FIG. 1. Using this screen, it is possible to individually specify a part/ASSEMBLY and a range. Starting ASSY display column 51 and ending ASSY display column 52 display a starting part and an ending part specified at the screen of the parts tree structure diagram. By controlling adding button 53, the specifying range can be displayed on list (starting/ending ASSY specifying list) 54, which will be used to setup the following process. In order to specify the unnecessary range, such an item is selected from list 54, and delete button 55 is pressed. Then, the item is deleted from the list and the specified range is canceled.

Figure 10:
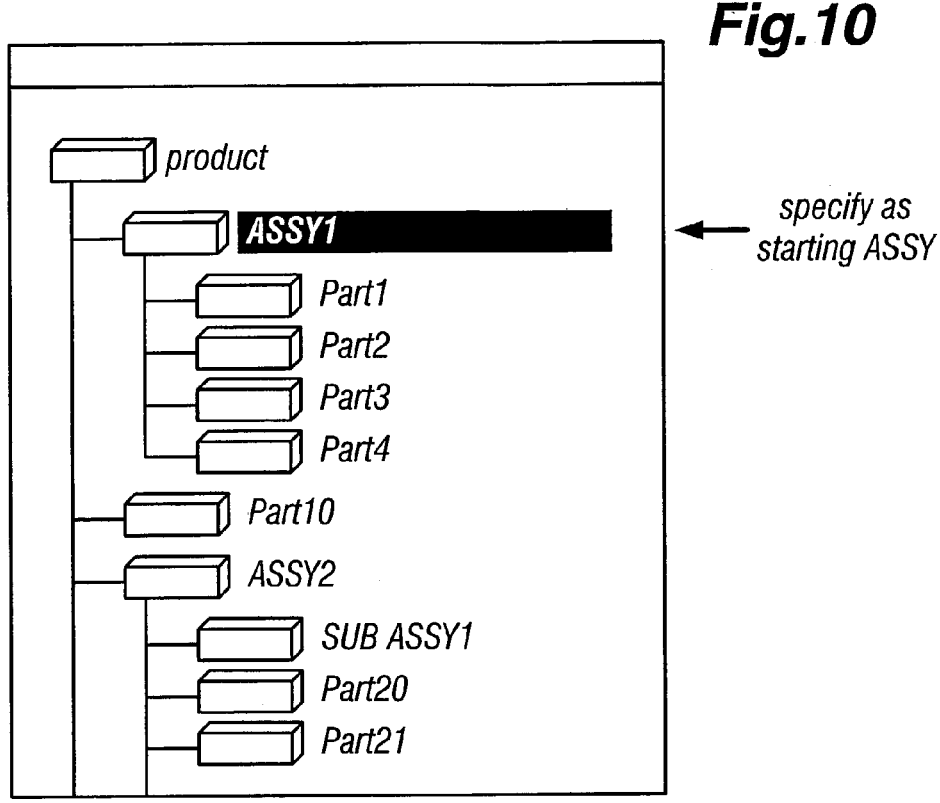
FIG. 10 illustrates another display screen of a parts tree structure diagram at the information processing apparatus for generating data of FIG. 1.
Figure 11:
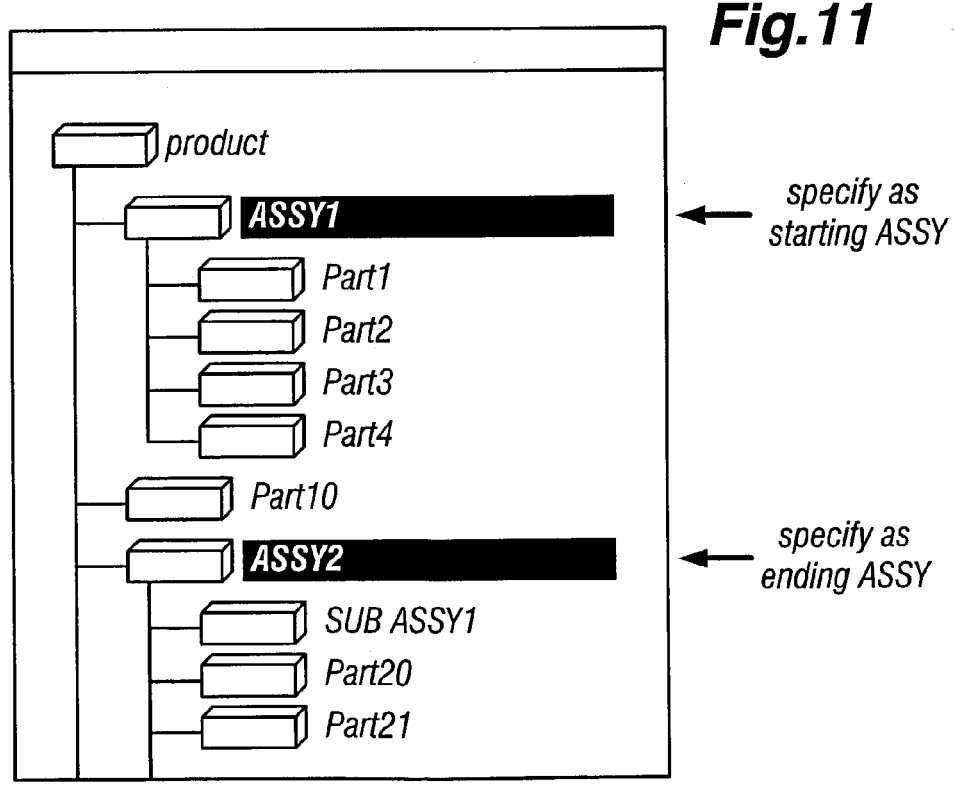
FIG. 11 illustrates another display screen of a parts tree structure diagram at the information processing apparatus for generating data of FIG. 1.
Figures 12, 13:
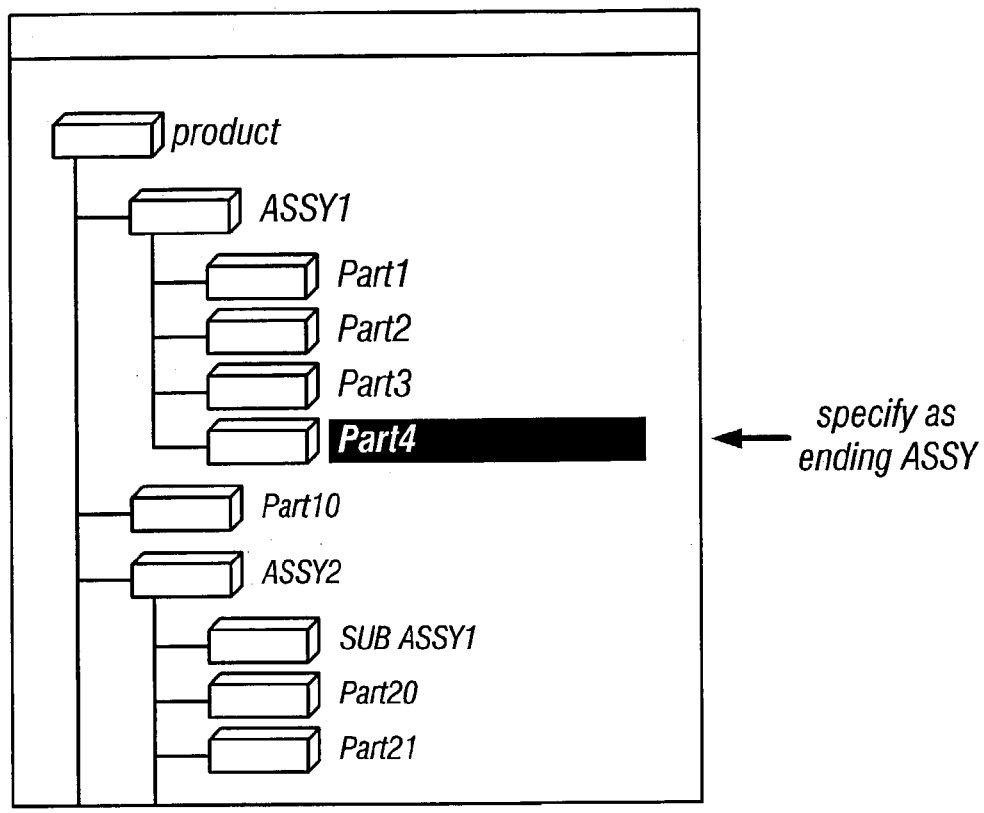
FIG. 12 illustrates another display screen of a parts tree structure diagram at the information processing apparatus for generating data of FIG. 1.
FIG. 13 illustrates a preliminary management table generated by a management table generator of FIG. 1.

FIGS. 10, 11, and 12 illustrate other examples of the display screen of the parts tree structure diagram at the information processing apparatus for generating data of FIG. 1. As shown in FIG. 10, when only the starting item is specified without specifying the ending item, only single item is selected. When the single item is an ASSEMBLY (ASSY1), the constructed image and images of the configuring parts (Parts 1–4) are output. When both starting and ending items are selected, as shown in FIG. 11, all the parts and ASSEMBLY between the selected items are chosen. Therefore, an image of the ASSEMBLY (ASSY1), images of parts subordinate to the ASSEMBLY (Parts 1–4), an image of Part 10 and a constructed image of the ASSEMBLY (ASSY2) are output. As shown in FIG. 12, when only the ending item is specified without specifying the starting item, only single item is selected, outputting the image of Part 4. Accordingly, it is possible to freely specify an output item on the parts tree structure diagram. When the ending item is above the starting item, it is treated as an error, and the output process is not performed.

FIG. 13 illustrates a preliminary management table generated by the management table generator shown in FIG. 1. This preliminary management table is generated based on the parts tree information in the CAD file. By associating the information with the name of outputting parts, ASSEMBLY, and finished product ("Part"), the table stores the assembly order number specifying the processing order for an assembly scene output ("No."), setup time indicating a waiting time until starting a display of the next image ("Time"), moving direction information (image moving information) for displaying the move of the output image ("move"), display change specifying information that specifies the necessity of a process to change display location, display angle, and display size of the output image ("view change"), internal identifying information for the output ("UID"), composition element information differentiating a part from an ASSEMBLY ("Comp fig"), display layer ordering information that specifies fore-and-aft location when a plurality of output images are displayed on the same scene ("dept"), type information indicating an item that does not have an output image in the 2-D data file, e.g., a tool ("kind"), and reverse expansion negligence information that does not allow the output during the screen output of a dissembling scene in the opposite order from an ASSEMBLY ("Non rev").

When a plurality of items have the same assembly order number (No.), they construct the same scene and their processes start at the same time. The setup time (Time) uses seconds. Moving direction information (move) specifies "0" for fixed display, "1" for moving from right to left, and "1" for moving from left to right. Display change specifying information (view change) specifies "1" for changing display, which is later followed by a screen display specifying a specific change, in order for the operator to perform the specified operation. Internal identifying information (UID) is automatically added and therefore unchangeable. Composition element information (Comp fig) specifies "1" for a part, and "2" for an ASSEMBLY. In display layer ordering information (dept), when a number other than "0" is specified, the number becomes the display layer order, having the greater number displayed in the front. When only "0" is specified in the same scene, the actual display layer order is set according to the order of the line, having the latest in number displayed in the front. Reverse expansion negligence information (Non rev) sets "1" for non-display.

FIG. 14 illustrates a management table stored in a management data file of FIG. 1. This management table is modified when the operator inputs the modification based on the preliminary management table. The information items to be stored are the same as the preliminary management table. In this example, ASSEMBLY WK1 from parts A and B, ASSEMBLY WK2 from ASSEMBLY WK1 and part C, and a driver are added. Considering the actual assembly steps, setup time (Time) and moving direction information (move) are modified in this management table. Further, display change specifying information (view change) is also modified to have an enlarged display of ASSEMBLY WK1, to match the small size of part C in the second scene. In the last line, repeat specifying information (R) is added in order to repetitively output the series of assembly scenes on the screen. Moreover, the management data file can be modified by a multi-use spread sheet application, when the file has a CSV format.

FIG. 15 illustrates a management table for output, stored by a management data file for output of FIG. 1. This management table for output stores, in accordance with file names (filename) for output images stored in the 2-D data file, assembly order number (No.), setup time (Time), moving direction information (move), display layer ordering information (dept), through color information (through color), and reverse expansion neglect information (Non rev). Through color information (through color) specifies the background color. In this example, black color is specified according to the RGB primary-color hexadecimal display. Others are the same as the above-described management table.

FIG. 16 illustrates a scenario table generated on a RAM of FIG. 2. This scenario table is used by the authoring unit to output the assembly scene, and is generated based on the management table of the management file. This scenario table is prepared for each scene, setting file name within the management table (filename), moving direction information (move), display layer ordering information (dept), and information regarding display time, stopping time, displaying coordinates, and moving coordinates that are analyzed by the management table. Information for each display time and stopping time is calculated from the setup time (Time) in the management table. Information for each displaying coordinates (moving starting location) and moving coordinates (moving ending location/moving amount) is calculated from moving direction information of the management table (move), thereby setting specific coordinates. In addition, it is possible to setup trail information when an image has a curvilinear move.

Figure 17:
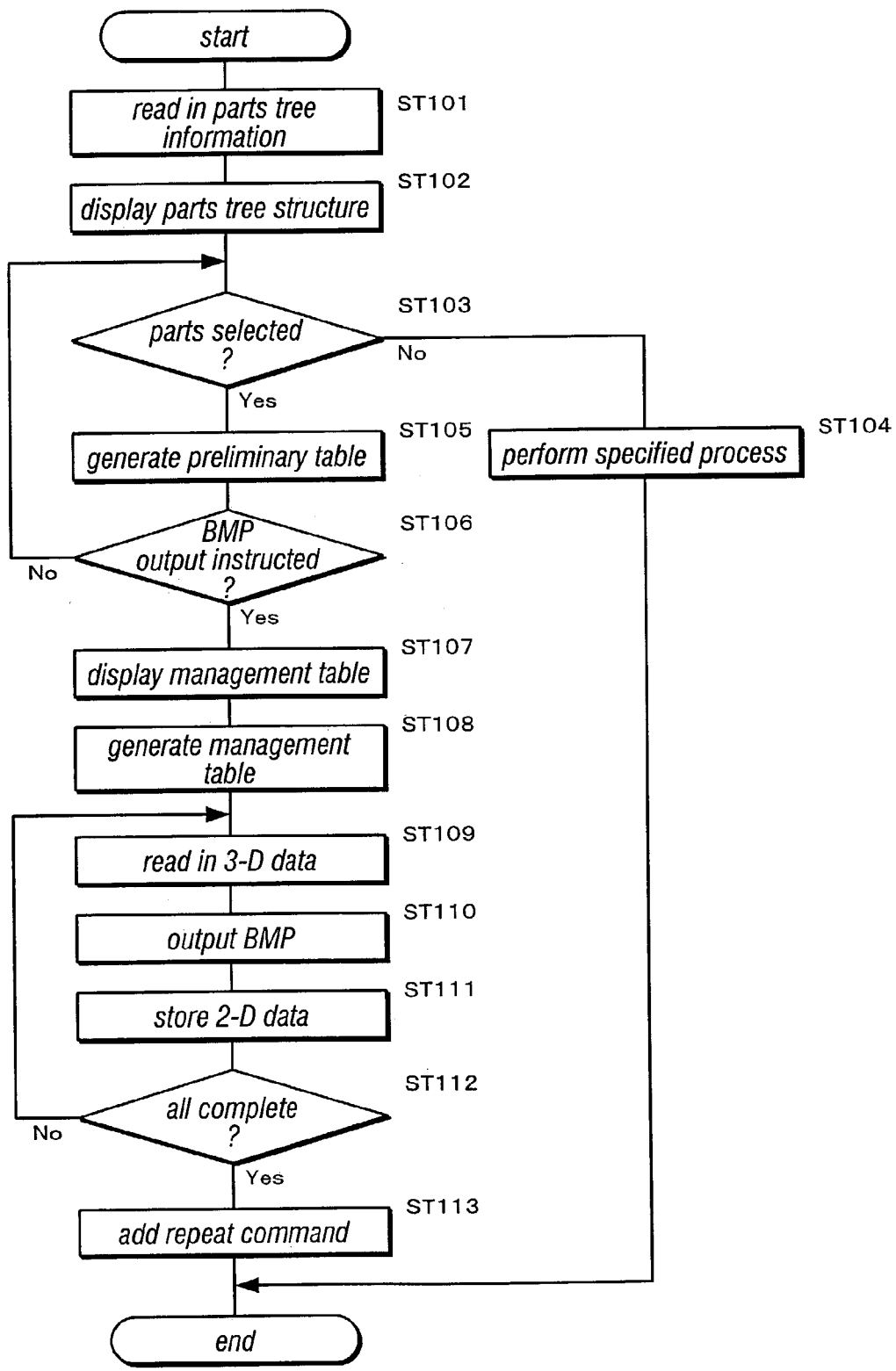
FIG. 17 is a flowchart illustrating a procedure of a data generating process performed by the information processing apparatus of FIG. 1.

FIG. 17 is a flowchart illustrating a procedure of a data generating process performed by the information processing apparatus of FIG. 1. In this example, when an output item is specified from the parts tree structure diagram, a preliminary management table is generated. Further, when the bitmap output is requested, the operator modifies the management table based on the preliminary management table. Upon completing the modifying process, 2-D image data is generated for output, based on the 3-D data in the CAD file.

At Step 101, the parts tree information in the CAD file is read in. At Step 102, parts tree structure diagram is displayed on the display. When other processes are selected on the display screen on the display at Step 103, the control proceeds to Step 104 to execute the corresponding processes. When a part is selected at Step 103, the control proceeds to Step 105 to generate the preliminary management table. Then, when the bitmap output is instructed at Step 106, the control proceeds to Step 107. When the bitmap output is not instructed at Step 106, the control returns to Step 103.

At Step 107, the preliminary management table is displayed on the display in a modifiable state. When the operator modifies the management table, the management data generator generates management table data with the modification at Step 108. Then the control proceeds to Step 109.

At Step 109, 3-D data of parts and ASSEMBLY specified as output items in the management table is retrieved from the 3-D data in the CAD file. Then, at Step 110, bitmap image data of the parts and ASSEMBLY is output based on the 3-D data. At Step 111, the bitmap image data is stored as 2-D data file in the hard disk. The above-described process is repeated from the first line data to the last line data in the management table. When it is determined that the process of the last line data is completed at Step 112, the control proceeds to Step 113 in order to execute a process of adding a repeat command according to the operator's instruction.

Figure 18:
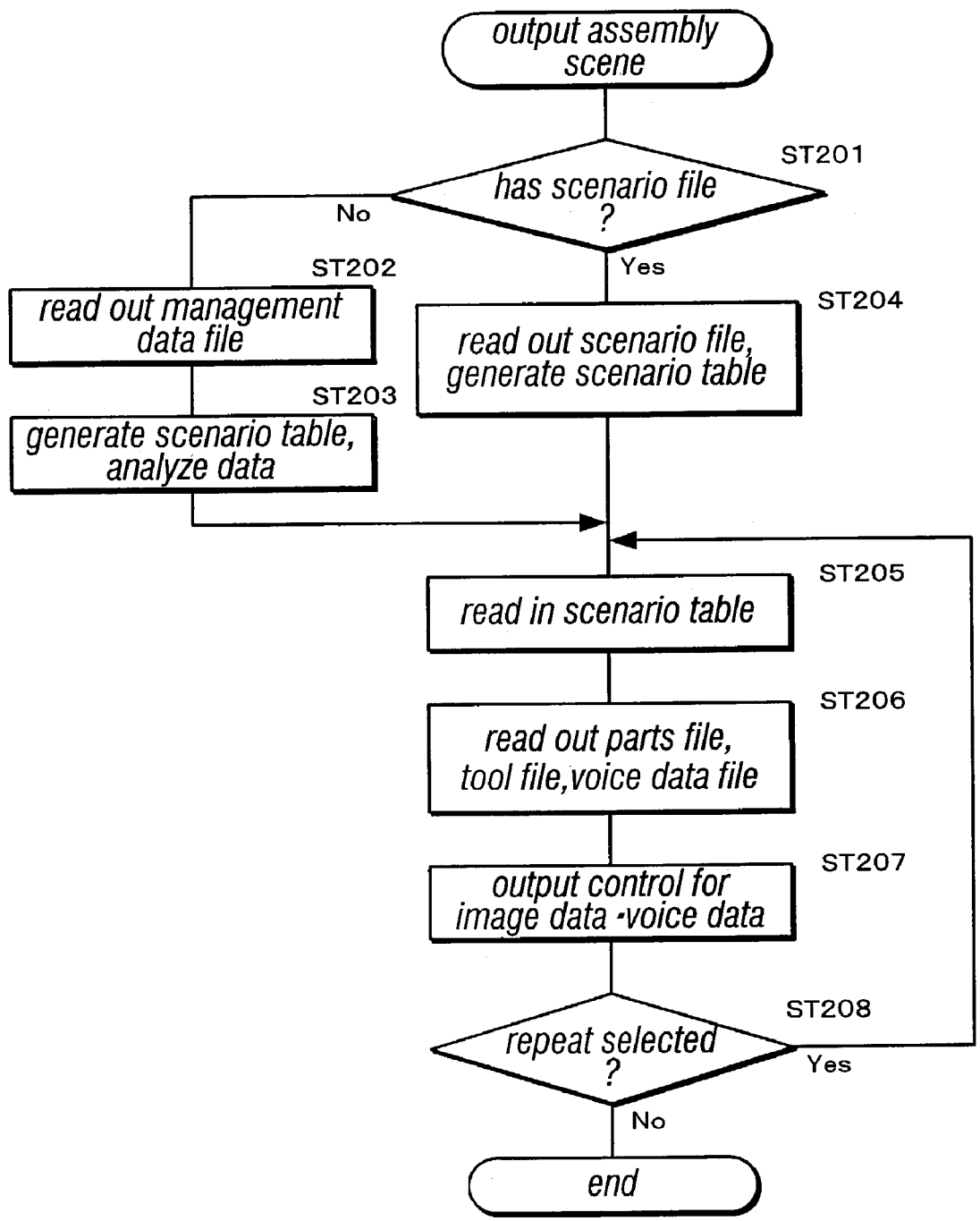
FIG. 18 is a flowchart illustrating a procedure of an assembly scene output process at a PC for assembly scene output of FIG. 2.

FIG. 18 is a flowchart illustrating a procedure of an assembly scene output process at a PC for assembly scene output of FIG. 2. In this example, when a scenario file is not found in the hard disk at the first assembly scene output, a scenario table is generated based on the management data file, based on which an assembly scene is output. When the scenario file is already found in the hard disk, a scenario table is generated based on the scenario file, in order to output the assembly scene.

When the scenario file is not found at Step 201, the control proceeds to Step 202 in order to read out the management data file. At the following Step 203, scenario table is generated on the RAM based on the management table. At the same time, from a data analysis, necessary information is set in the scenario table. Then the control proceeds to Step 205. However, when the scenario file is found at Step 201, the scenario file is read out at Step 204. Then, the scenario table is generated on the RAM, and the control proceeds to Step 205.

At Step 205, the authoring unit reads in the scenario table on the RAM. Then, at Step 206, 2-D data file, tool data file, and voice data file are read out from the hard disk, in order to retrieve the image data of parts/ASSEMBLY/finished product, image data of tools, and voice data that are specified in the scenario table. Then, at Step 207, output control for the image data and voice data is performed according to the scenario table. When an assembly scene is output on the screen, voice data explaining the scene is output at the same time. When it is determined that repeating is instructed at Step 208, the control returns to Step 205, to re-output the assembly scene.

Figure 19:
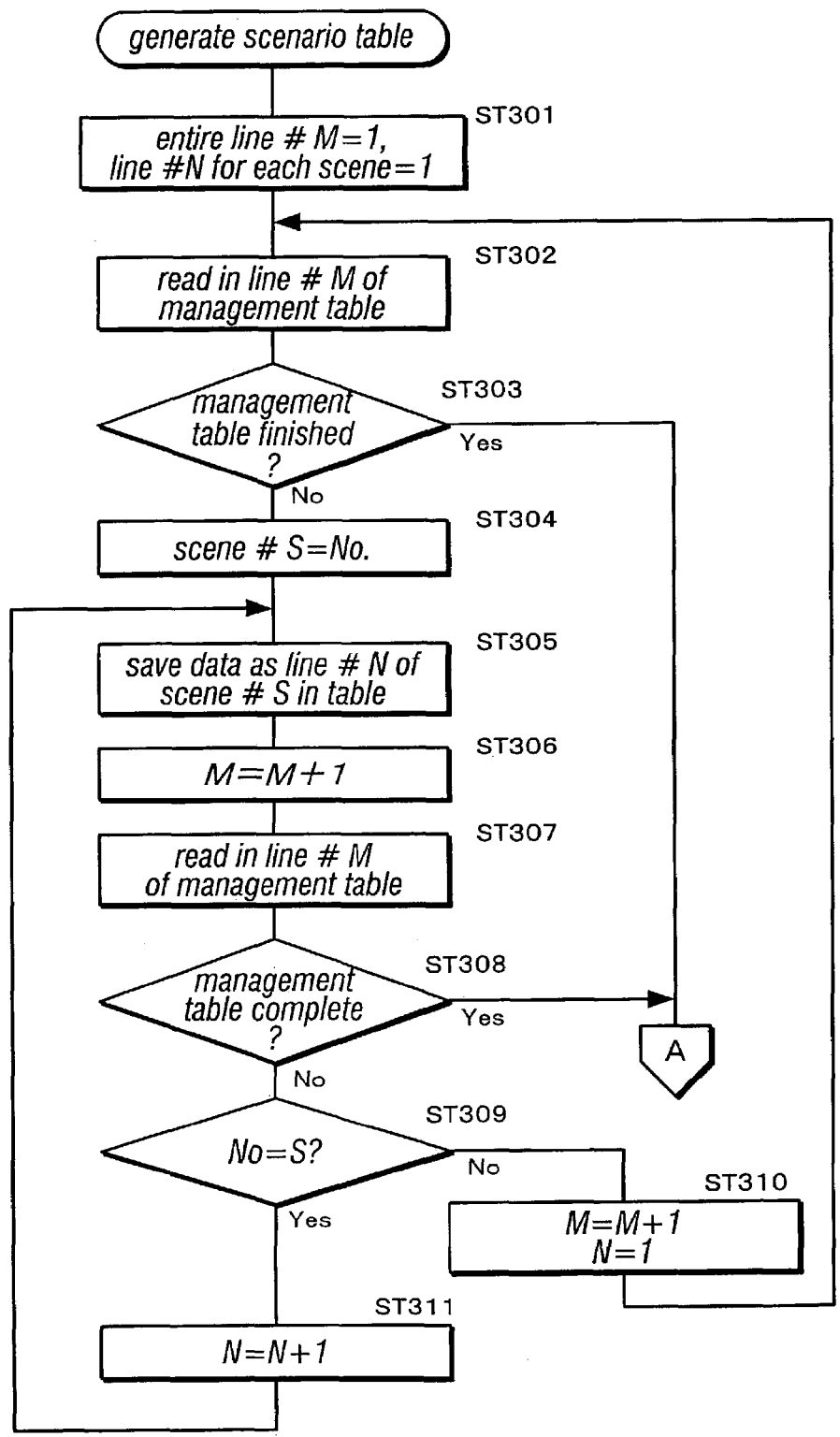
FIG. 19 is a flowchart illustrating a procedure of generating a scenario table from management data of FIG. 18.
Figure 20:
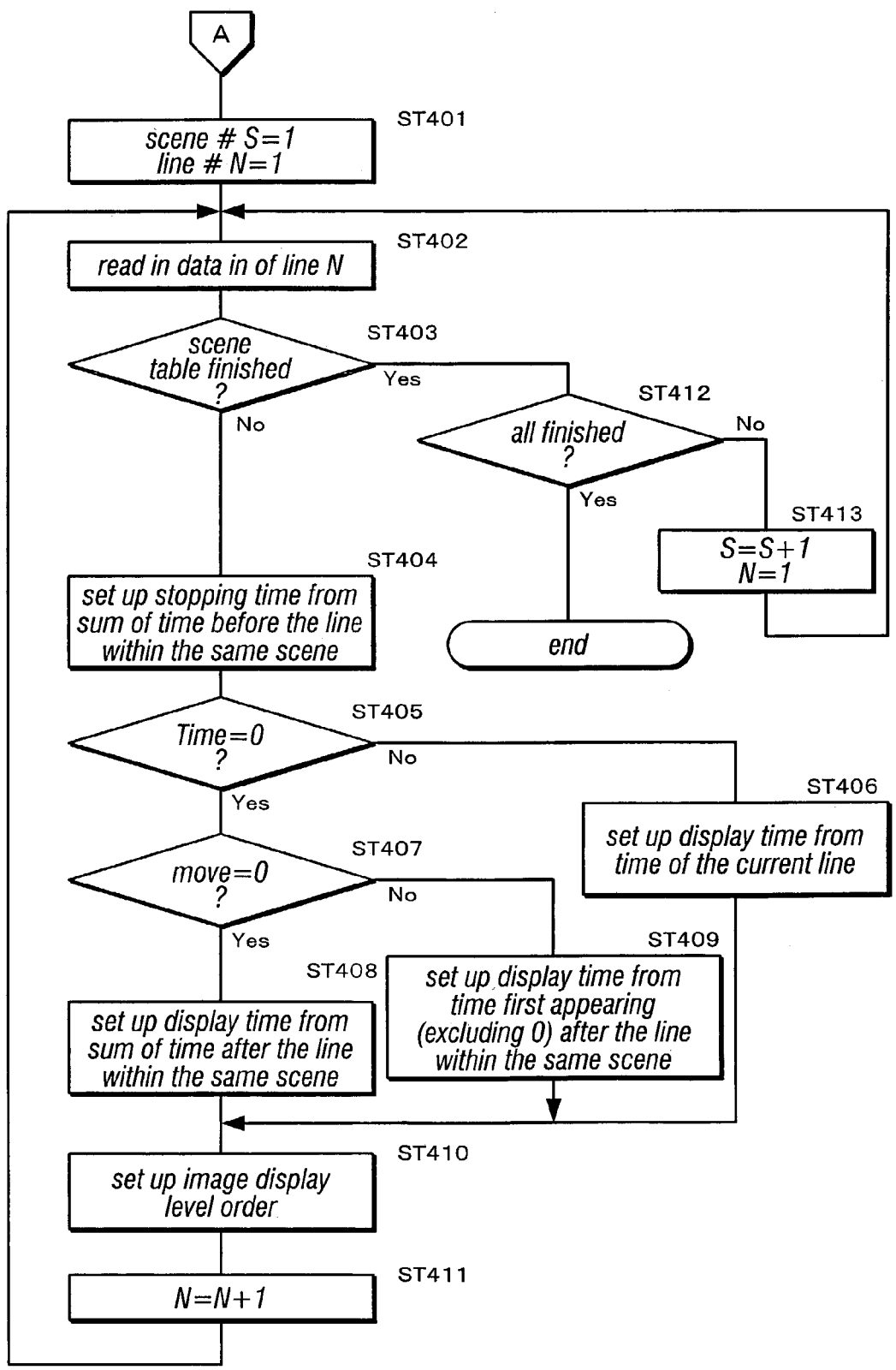
FIG. 20 is a flowchart illustrating a procedure of generating a scenario table that follows FIG. 19.

FIGS. 19 and 20 are flowcharts illustrating a procedure of generating a scenario table from the management data of FIG. 18. In this example, data in the management table is expanded on the RAM in order to generate a scenario table for each scene. Then, by analyzing the data, information necessary for the output control at the authoring unit is set at the scenario table.

First, at Step 301, an initializing process is executed, where 1 is assigned to both line M (for the entire management table) and line N (for each scene). At Step 302, data at line M in the management table is read in. When it is determined that more line(s) can be read in (i.e., the management table is not completed) at Step 303, the control proceeds to Step 304. At Step 304, assembly order number (No.) of the line M is assigned to scene number S. At the following Step 305, data of line M is stored as line N of the scene number S in the scenario table. Then, the control proceeds to Step 306.

At Step 306, entire line number M is incremented by one to move to the next line. At Step 307, data in line M of the management table is read in. At Step 308, it is determined whether the management table is completed. When it is not completed, the control proceeds to Step 309 to check whether the assembly order number (No.) of line M equals to scene number S (i.e., to check whether the scene has not changed). If the scene has changed, the control proceeds to Step 310 to increment the entire line number M by one, and to assign 1 to scene individual line number N. Then, the control returns to Step 302 to process a table in the next scene.

In contrast, when it is determined that the scene has not changed at Step 309, the control proceeds to Step 311, where the scene individual line number N is incremented by one. Then the control proceeds to Step 305 to store the data in the table. The above-described process is performed until the management table is completed. When it is determined that the management table is completed at Steps 303 and 308, the control proceeds to a data analyzing process for each scene, which starts at Step 401 of FIG. 20.

At Step 401 of FIG. 20, an initialization process is performed, where 1 is assigned to both scene number S and scene individual line number N. At the following Step 402, Data in line N is read in. Then, at Step 403, it is checked whether the table in the scene is not completed (i.e., more line(s) need to be read in). If the table in the scene is not completed, the control proceeds to Step 404 to set the sum value of setup time (TIME) of the earlier lines from line N within the same scene, the sum value being regard as a stopping time (display waiting time). Then, the control proceeds to Step 405.

At Step 405, it is checked whether the setup time (TIME) for line N is set to 0. When the setup time (TIME) is not 0, the control proceeds to Step 406 to set the setup time (TIME) as the display time. When the setup time (TIME) is 0, the control proceeds to Step 407 to check whether the moving direction (move) is 0. When the moving direction (move) is 0 and the image of the current line is not to be moved, the control proceeds to Step 408 to set the sum value setup time (TIME) after the current line as the display time. When the moving direction (move) is not 0, and the image of the current line is to be moved, the control proceeds to Step 409.

Then, at Step 409, the first appearing value of the setup time (TIME) that is not 0, after the current line, is set as the display time.

When the above-described setup process for the display time is completed, the control proceeds to Step 410 to set the image display level order of the current line. In this example, when the display level orders (dept) in all lines are not 0, the given value becomes the display level order. When all the display level orders are 0, the display level orders are set according to the order of the line numbers. Next, at Step 411, scene individual line number N is incremented by one. Then, the control returns to Step 402 to move to the analyzing process for the next line. When it is determined that the table in the scene is completed at Step 403, the control proceeds to Step 412 to check whether the tables for all scenes are completed. When the tables for all scenes are not completed, scene number S is incremented by one and the scene individual line number N becomes 1 (Step 413). Then, the control returns to Step 402 to proceed to a process for another scene. In contrast, when it is determined that the tables for all scenes are completed at Step 412, a procedure is performed in accordance with whether the repeat command (R) exists, which completes the process.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as modified, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2002-115097 filed on Apr. 17, 2002, entire content of which is expressly incorporated by reference herein.

What is claimed is:

1. An information processing apparatus comprising:
   a first memory configured to store 3-D data indicating a plurality of components, a product being assembled based on the plurality of the components;
   a display configured to display the 3-D data indicating the plurality of the components;
   an input device configured to input a viewing orientation of the displayed 3-D data;
   a second memory configured to store management data, the management data including an assembly process for assembling the product, based on the plurality of components; and
   a controller configured to convert the 3-D data indicating the plurality of the components into 2-D data indicating the plurality of the components, based on the viewing orientation input by the input device;
   the controller being further configured to output, to another information processing apparatus, the converted 2-D data indicating the plurality of the components and the management data including the assembly process without the 3-D data indicating the plurality of the components, the another information processing apparatus being discrete from the information processing apparatus, whereby the another information apparatus assembles the 2-D data indicating the plurality of components, based on the assembly process included in the management data and displays the assembled 2-D data on a display of the another information processing apparatus.

2. The information processing apparatus according to claim 1, wherein the 2-D data comprises bitmap image data.

3. The information processing apparatus according to claim 1, wherein the 3-D data is generated by a 3-D CAD device and is stored in the first memory of the information processing apparatus.

4. The information processing apparatus according to claim 1, wherein the management data comprises one of an order of the components for displaying the 2-D data indicating the plurality of the components during the assembly process, a time for displaying each of the 2-D data indicating the plurality of the components, move information indicating movement of each of the 2-D data indicating the plurality of the components when each of the 2-D data indicating the plurality of the components is displayed, display information indicating display location, angle, and size with respect to each of the plurality of the components, and fore-and aft locations of the plurality of the components when the 2-D data indicating the plurality of the components are displayed on one scene.

5. The information processing apparatus according to claim 4, wherein the management data comprises information indicating which 2-D data is being displayed, information identifying one component or information identifying one assembly including the plurality of the components.

6. The information processing apparatus according to claim 1, wherein the second memory stores a basic management data, the basic management data indicating a basic assembly process for assembling the product.

7. The information processing apparatus according to claim 6, wherein the basic management data is configured for modification, based on a user's indication input by the input device.

8. The information processing apparatus according to claim 1, wherein the output 2-D data comprises 2-D data indicating an assembly into which the plurality of the components are assembled, and the management data indicates a change of a display from a combination of the 2-D data indicating the plurality of components into the 2-D data indicating the assembly when the 2-D data indicating that the plurality of the components are assembled is displayed.

9. The information processing apparatus according to claim 1, wherein the output 2-D data comprises 2-D data indicating a component smaller than another component and enlarged 2-D data indicating the another component, and the management data indicates a change of a display from the 2-D data indicating the another component into the enlarged 2-D data indicating the another component when the 2-D data including the smaller component is displayed with the 2-D data indicating the another component.

10. The information processing apparatus according to claim 1, wherein the management data comprises a command for repeating the assembly process indicated by the management data when the assembly process ends.

11. A computer readable medium storing a computer program, the computer program installed in an information processing apparatus, the computer readable medium comprising:
   a code segment configured to store 3-D data indicating a plurality of components, a product being assembled based on the plurality of the components;
   a code segment configured to display the 3-D data indicating the plurality of the components;
   a code segment configured to input a viewing orientation of the displayed 3-D data;
   a code segment configured to convert the 3-D data indicating the plurality of the components into 2-D data indicating the plurality of the components, based on the input viewing orientation;
   a code segment configured to store management data, the management data including an assembly process for assembling the product, based on the plurality of components;
   a code segment configured to output, to another information processing apparatus, the converted 2-D data indicating the plurality of the components and the management data including the assembly process without the 3-D data indicating the plurality of the components, the another information processing apparatus being discrete from the information processing apparatus, whereby the another information apparatus assembles the 2-D data indicating the plurality of components, based on the assembly process included in the management data, and displays the assembled 2-D data on a display of the another information processing apparatus.

12. A method for displaying a process for assembling 2-D data indicating a plurality of components into 2-D data indicating a product formed by the plurality of the components, the method comprising:
   storing 3-D data indicating a plurality of components, a product being assembled based on the plurality of the components;
   displaying the 3-D data indicating the plurality of the components;
   inputting a viewing orientation of the displayed 3-D data;
   converting the 3-D data indicating the plurality of the components into 2-D data indicating the plurality of the components, based on the input viewing orientation;
   storing management data, the management data including an assembly process for assembling the product, based on the plurality of components;
   outputting, to another information processing apparatus, the converted 2-D data indicating the plurality of the components and the management data including the assembly process without the 3-D data indicating the plurality of the components, the another information processing apparatus being discrete from the information processing apparatus, whereby the another information apparatus displays the 2-D data indicating the plurality of components, based on the assembly process included in the management data, and displays the assembled 2-D data on a display of the another information processing apparatus.

* * * * *